ELECTRICAL IMPULSE GENERATORS

Filed April 17, 1951 7 Sheets-Sheet 1

INVENTORS.
Roscoe H. George,
BY George R. Cooper,
Brown, Jackson, Boettcher & Dienner
Attys.

Nov. 1, 1955 R. H. GEORGE ET AL 2,722,608

ELECTRICAL IMPULSE GENERATORS

Filed April 17, 1951 7 Sheets-Sheet 2

INVENTORS
Roscoe H. George,
BY George R. Cooper,
Brown, Jackson,
Boettcher & Dienner
Attys.

Nov. 1, 1955 R. H. GEORGE ET AL 2,722,608

ELECTRICAL IMPULSE GENERATORS

Filed April 17, 1951 7 Sheets-Sheet 3

INVENTORS.
Roscoe H. George,
BY George R. Cooper,
Brown, Jackson,
Boettcher & Dienner
Attys.

Nov. 1, 1955 R. H. GEORGE ET AL 2,722,608

ELECTRICAL IMPULSE GENERATORS

Filed April 17, 1951 7 Sheets-Sheet 4

INVENTORS
Roscoe H. George,
BY George R. Cooper,
Brown, Jackson, Boettcher & Dienner
Attys.

INVENTORS.
Roscoe H George,
BY George R Cooper,
Brown, Jackson,
Boettcher & Dienner
Attys Nov. 1, 1955 R. H. GEORGE ET AL 2,722,608

ELECTRICAL IMPULSE GENERATORS

Filed April 17, 1951 7 Sheets-Sheet 6

INVENTORS.
Roscoe H. George,
George R. Cooper,
BY Brown, Jackson
Boettcher & Dienner
Attys INVENTORS.
Roscoe H. George,
BY George R. Cooper,
Brown, Jackson, Boettcher & Dienner
Attys.

United States Patent Office 2,722,608
Patented Nov. 1, 1955

2,722,608

ELECTRICAL IMPULSE GENERATORS

Roscoe H. George and George R. Cooper, West Lafayette, Ind., assignors to Purdue Research Foundation, Lafayette, Ind., a corporation of Indiana Application April 17, 1951, Serial No. 221,394

20 Claims. (Cl. 250—37)

The present invention relates to electrical impulse generators.

Our improved impulse generators herein disclosed are capable of different applications, uses and adaptations, such as:

1. A standard signal generator of impulse type radio interference, particularly adapted to provide a reproducible standard noise signal for use in calibrating noise measuring equipment used for production and experimental radio noise measurements.
2. A signal generator for studying the performance of radio receivers under shock excitation; for studying methods of noise suppression in radio receivers; for testing noise suppression filters; and for studying the performance of electrical contacts, etc.
3. A source of continuous spectrum signals for investigating the millimeter wavelengths.
4. A signal source for a short range radar transmitter.
5. A standard signal source for continuously monitoring radar receivers.
6. A generator of signals approximating random radio noise.

One of the objects of the invention is to provide an improved impulse generator having continuous frequency spectra.

Another object of the invention is to provide an improved impulse generator capable of generating very steep wave fronts.

Another object of the invention is to provide an impulse generator wherein these steep wave fronts are applied to an improved system containing inductance, capacitance and effective resistance. This resistance may be in the form of ohmic resistance, the characteristic impedance of an output line or radiation resistance.

Another object of the invention is to provide improved means for controlling the shape and duration of the impulses. Certain embodiments of our invention are in the form of coaxial line impulse generators, and in these embodiments the shape and duration of the impulses are controlled by (*a*) the length of the discharge line; (*b*) the ratio of the effective resistance to the characteristic impedance of the discharge line; and (*c*) the actual characteristic impedance of the discharge line. If the impedance is made too high the fringing flux at the ends of the discharge line reduces the steepness of the wave front, changes the effective length of the line and may not supply energy fast enough to cause a very rapid build up of the discharge current.

Another object of the invention is to provide an improved construction, arrangement and operation of electrical contacts for producing the above steep wave fronts or step voltages in the impulse generator.

Another object of the invention is to provide an improved construction and arrangement for maintaining the electrical contact areas in these contactor embodiments clean.

Another object of the invention is to provide improved adjusting means for adjusting the contacts in the above contactor embodiments of the invention. One embodiment of this improved adjusting means is mechanical in its operation and another embodiment is electrical in its operation.

Other objects, features and advantages of the invention will appear from the following detail description of certain embodiments of the invention. In the accompanying drawings illustrating such embodiments:

Figures 1 to 12 inclusive constitute a series of explanatory diagrams provided for the purpose of facilitating a complete understanding of the invention, and in which:

Figure 11:
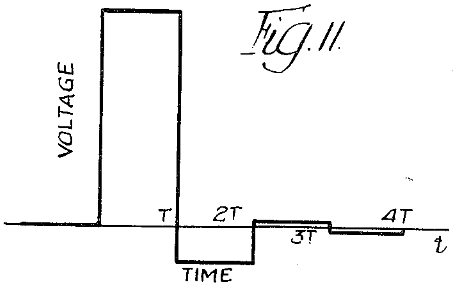
Figure 8:
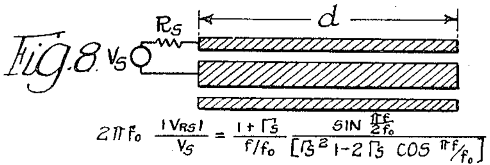
Figure 9:
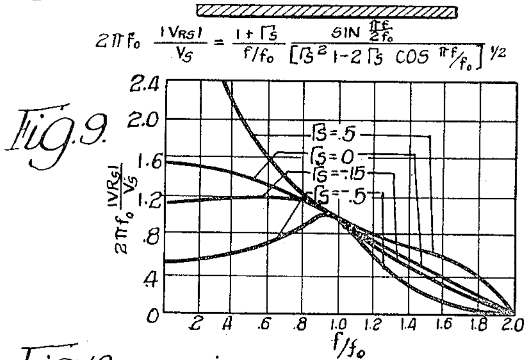
Figure 10:
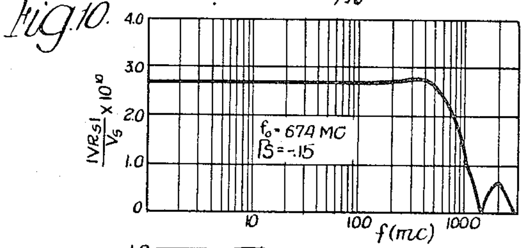
Figure 12:
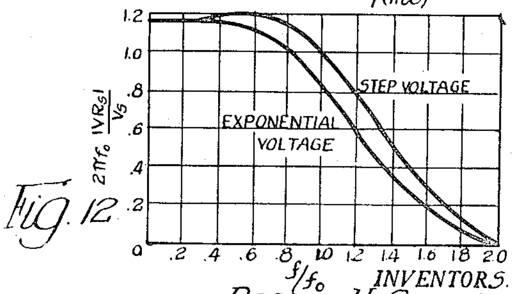
Figure 13:
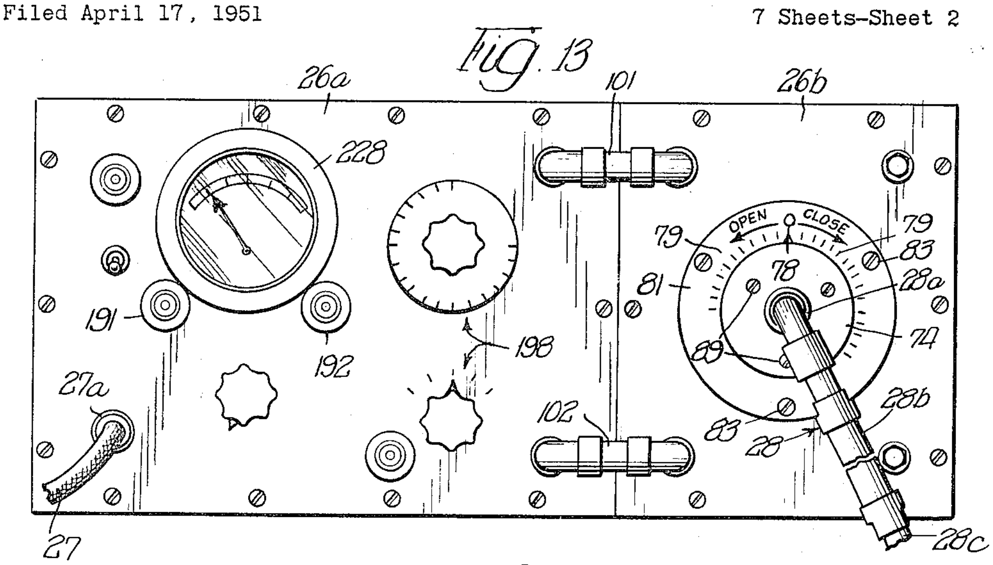
Figure 14:
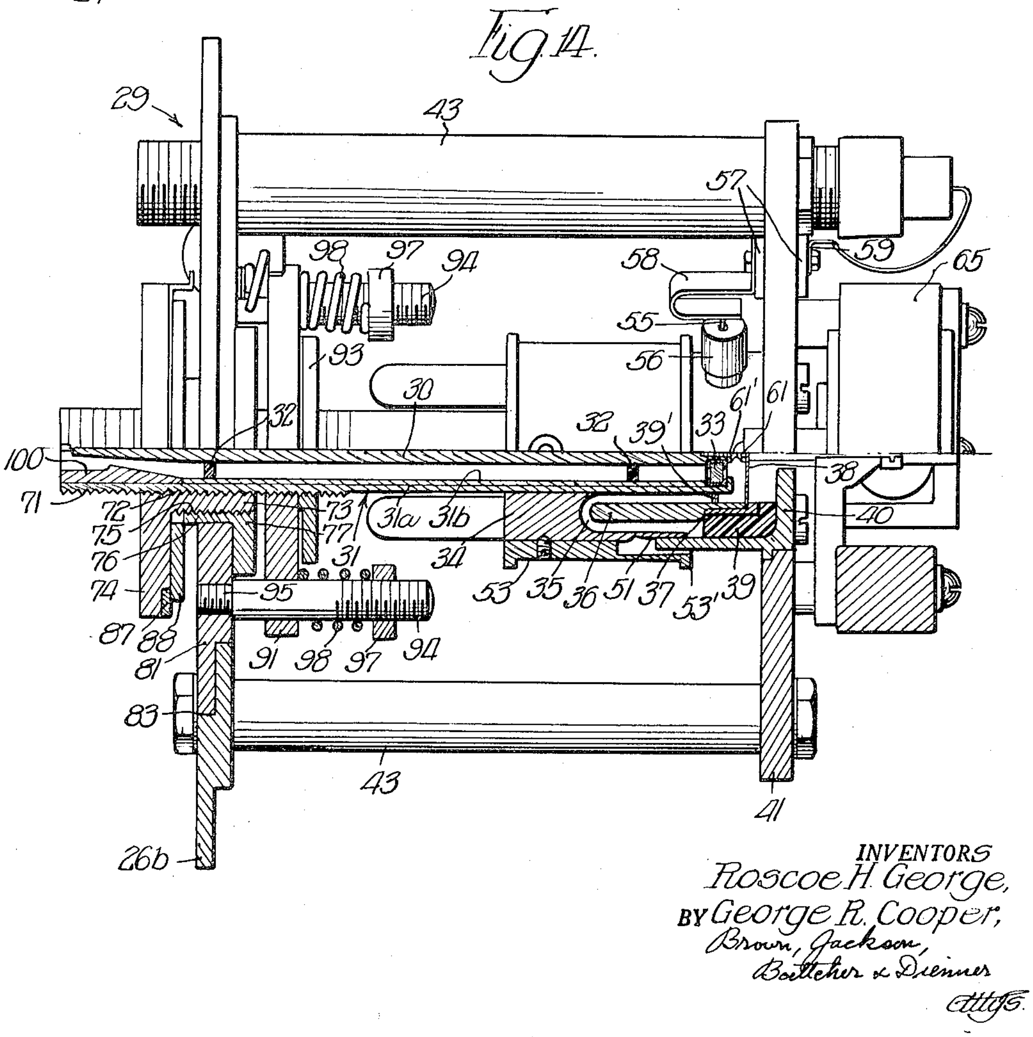
Figures 15, 16, 17, 18, 19:
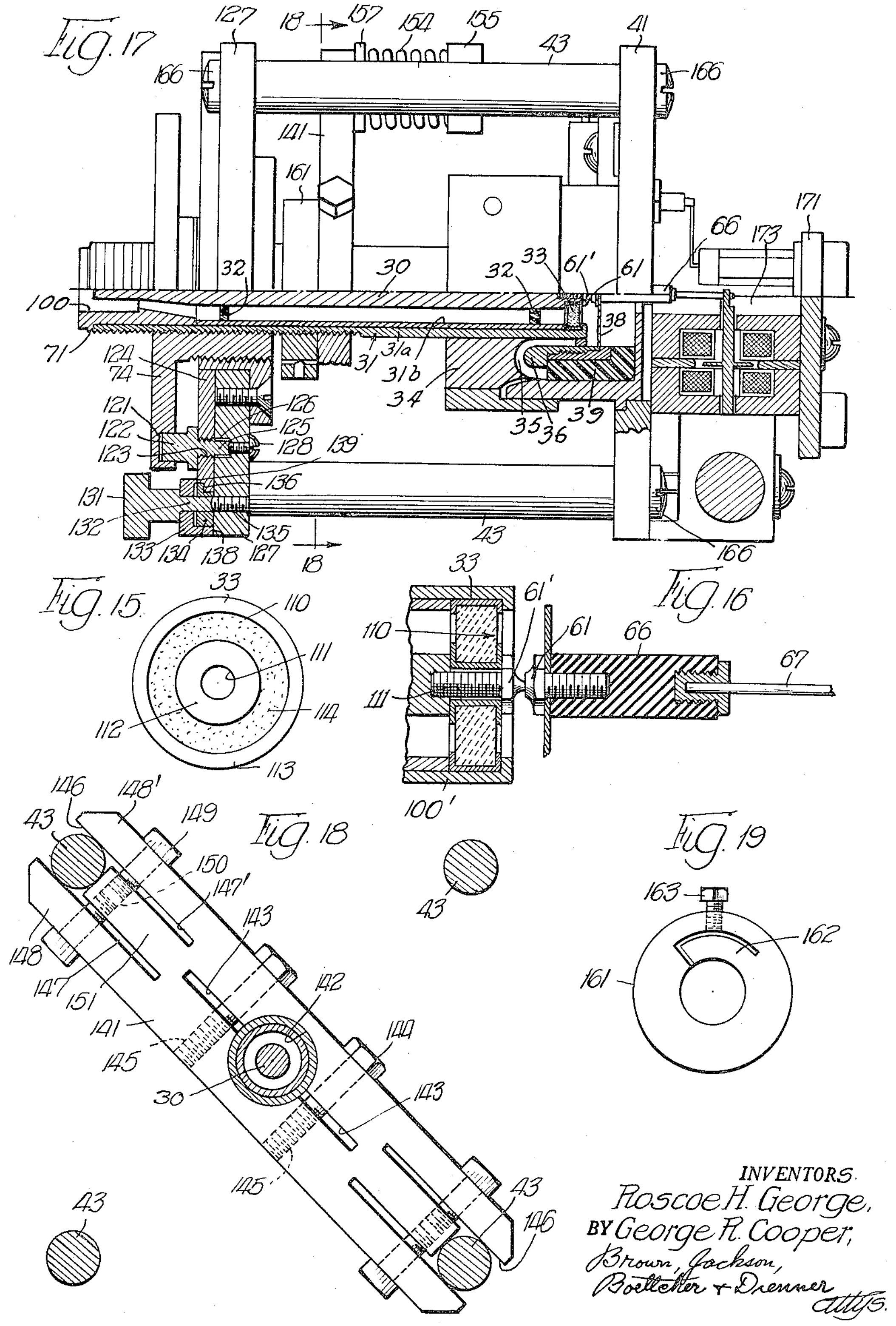
Figure 19A:
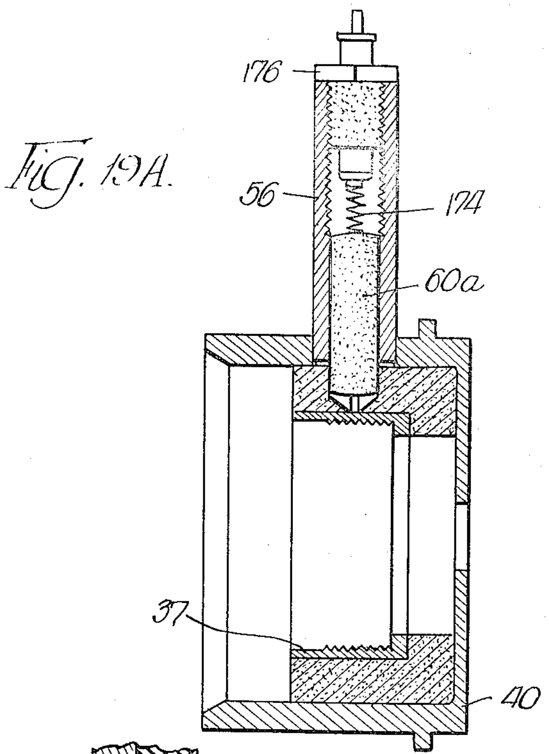
Figure 19B:
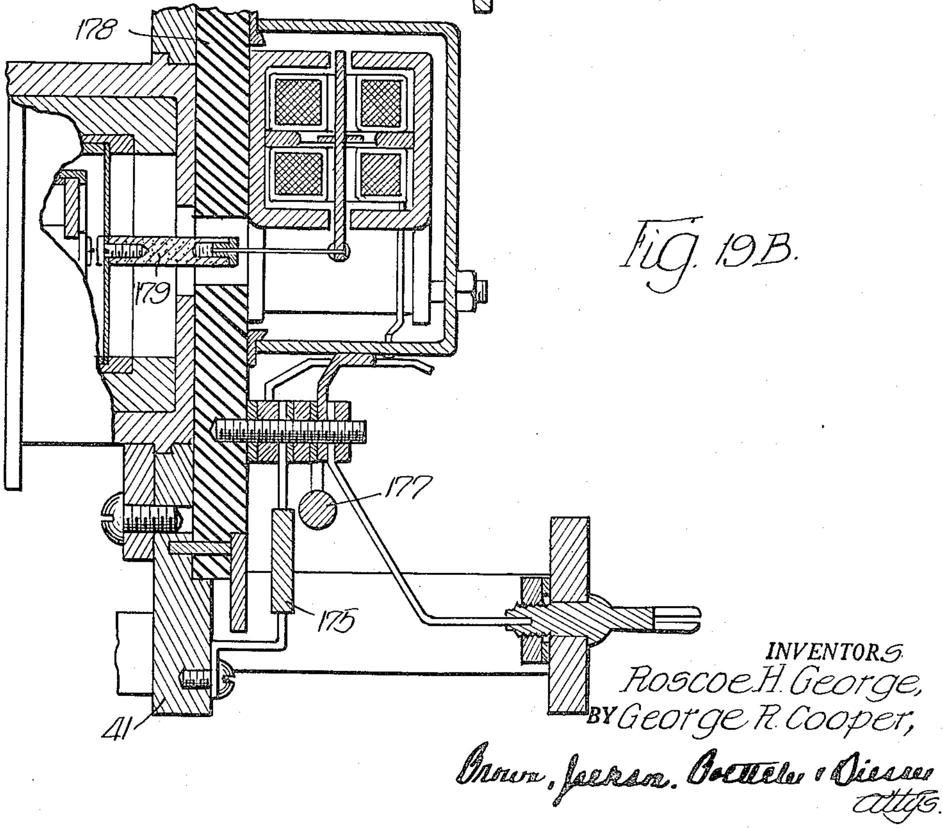
Figure 20:
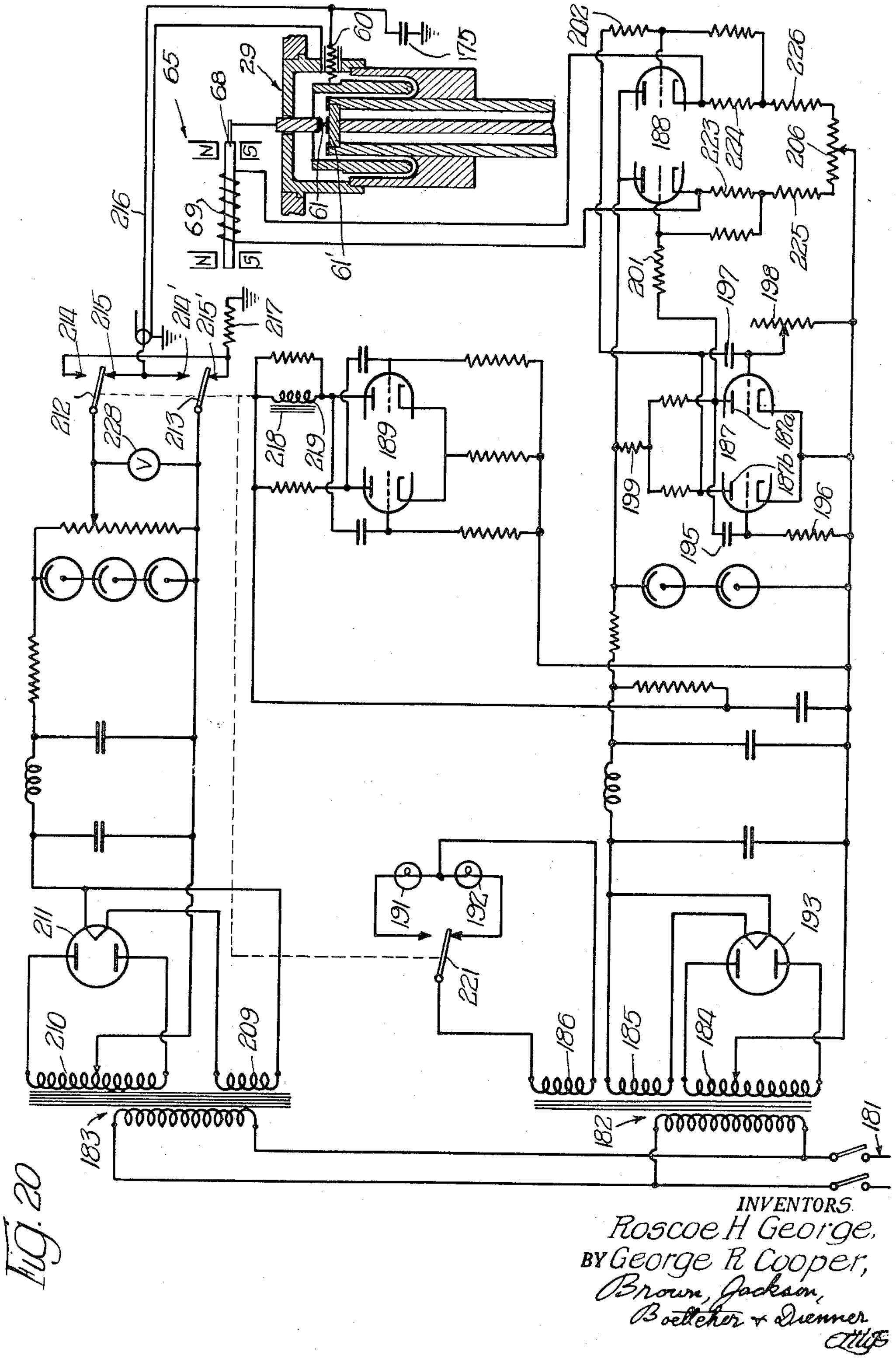
Figure 21:
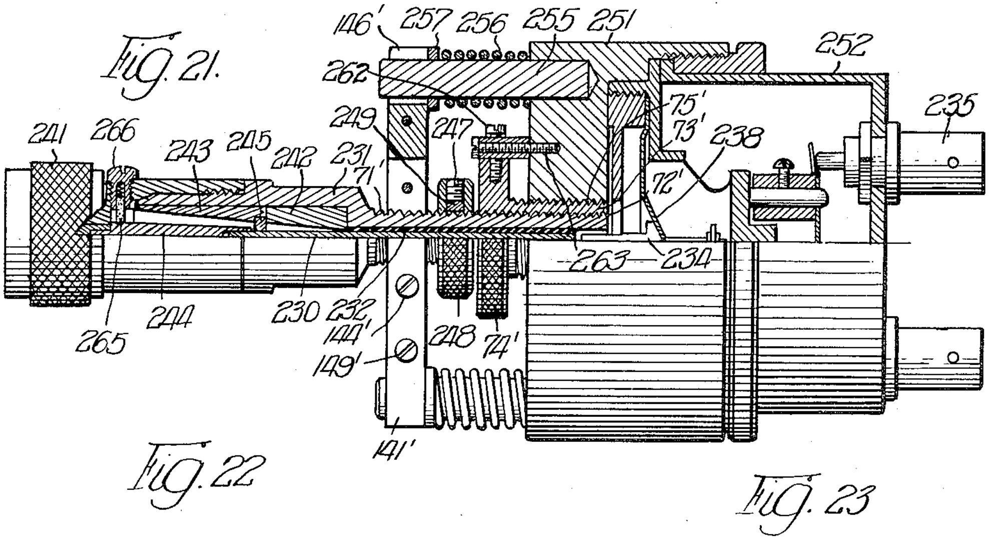
Figure 22:
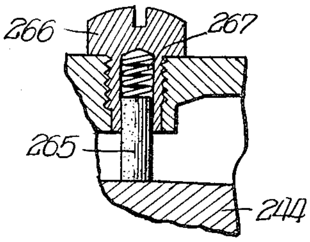
Figure 23:
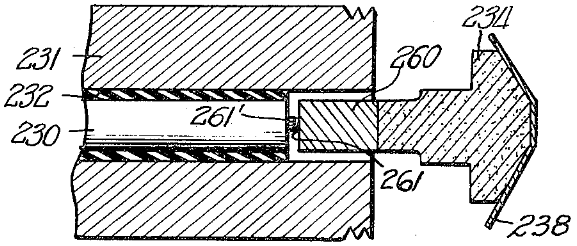
Figure 24:
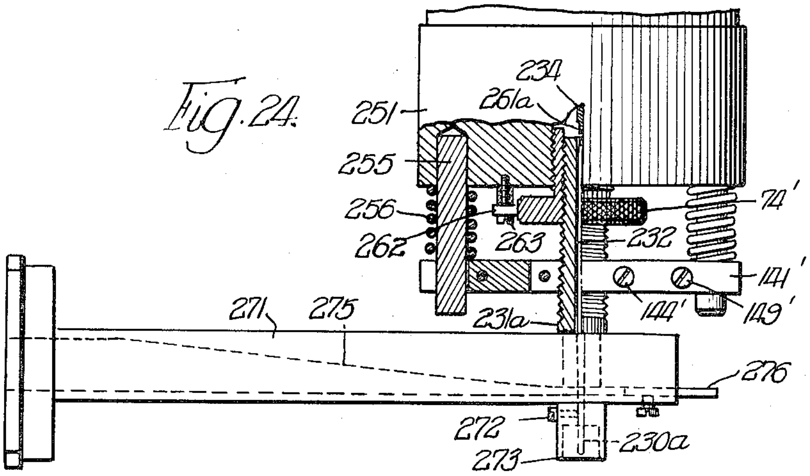
Figure 25:
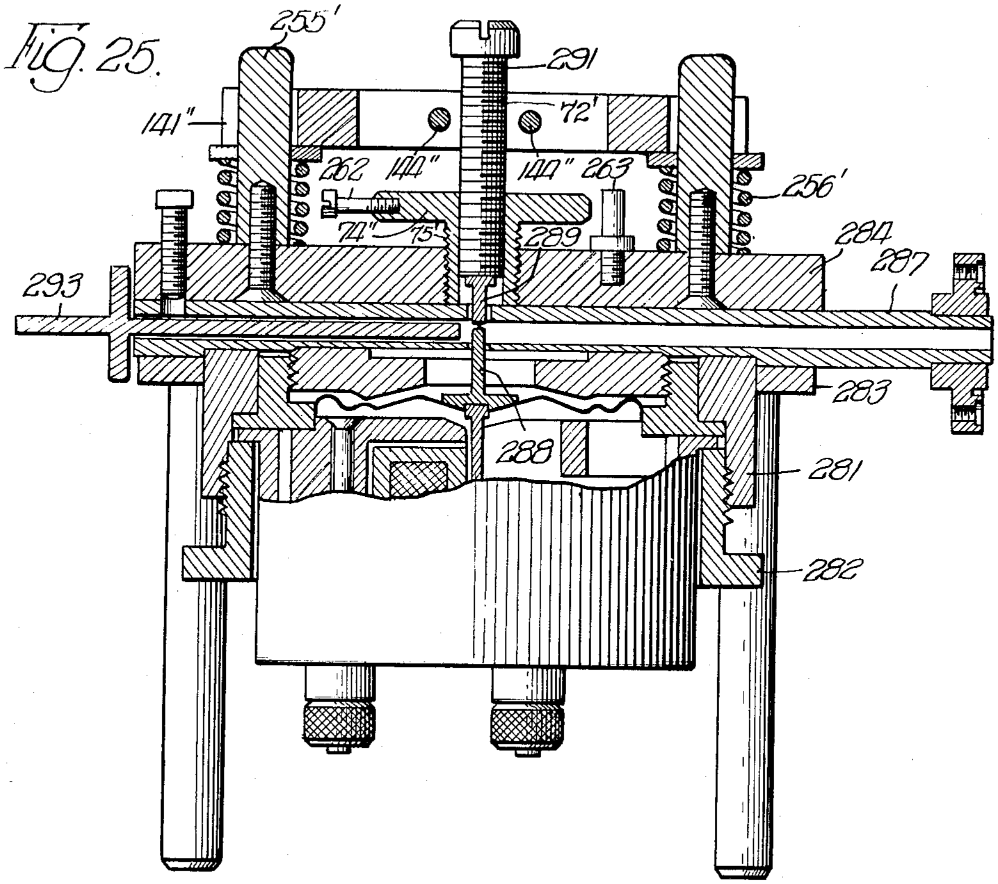
Figure 26:
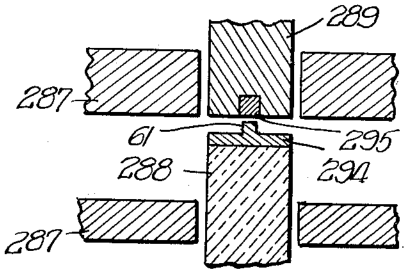

Figure 8 diagrammatically illustrates one idealized form of noise generator;

Figure 9 is a graph showing the frequency spectrum resulting from the application of a step voltage to the noise generator of Figure 8;

Figure 10 is a graph showing the theoretical frequency spectrum for one embodiment of our invention;

Figure 11 is a graph of the output pulse from our noise generator;

Figure 12 is a graph of frequency spectra resulting from the application of a step voltage and an exponential rise voltage to the noise generator of Figure 8;

Figure 13 is an elevational view of one embodiment of our invention using a coaxial line type of impulse generator, this figure showing the instrument panel and controls at the front end of the complete unit;

Figure 14 is a view of the coaxial line generator, partly in elevation and partly in section;

Figure 15 is a front elevational view of one form of discharge resistor;

Figure 16 is a fragmentary sectional view of the contact mechanism on an enlarged scale, showing the mounting of the discharge resistor;

Figure 17 is a view similar to Figure 14, illustrating another embodiment of the coaxial line generator;

Figure 18 is a fragmentary sectional view taken approximately on the plane of the line 18—18 of Figure 17, for illustrating the transverse clamping bar;

Figure 19 is a detail sectional view of the clamping nut which coacts with this clamping bar;

Figure 19A is a detail sectional view showing the charging resistor;

Figure 19B is a detail sectional view through one embodiment of magnetic driving unit;

Figure 20 is a diagram of the circuit used for operating the several embodiments of our improved impulse generators;

Figure 21 is a view similar to Figures 14 and 17, partly in elevation and partly in section, illustrating a microwave embodiment of our coaxial line type of impulse generator;

Figures 22 and 23 are fragmentary sectional views on a larger scale, illustrating details of the embodiment illustrated in Figure 21;

Figure 24 illustrates this latter embodiment of impulse generator coupled to a waveguide; and Figures 25 and 26 are sectional views of another embodiment of our invention in the form of a flat disk or radial line type of impulse generator.

We shall first describe an embodiment of our invention which is particularly adapted to function as a radio noise generator of the pulse type. That is to say, this embodiment is capable of producing periodic or random pulses of such shape and duration that they contain energy components extending over a frequency range from zero to above 1000 megacycles per second. These pulses are produced by discharging a short length of coaxial transmission line into a resistor—the discharge connection being made by a mechanically vibrating contact. We shall first briefly present the mathematical analysis underlying the design of such a system, and shall then describe a typical structure.

It is well known that current or voltage waveforms may be represented mathematically by either of two possible methods. The first method expresses the instantaneous value of the current or voltage as a function of time. The second method specifies the amplitudes and phases of sinusoidal functions of time which when added together will produce the original current or voltage. The expression relating the amplitudes and phases to the frequency of the sinusoid is known as the frequency spectrum of the current or voltage waveform. If the original waveform repeats itself periodically, the frequency spectrum which represents it will consist of discrete frequencies harmonically related to the frequency of the period. The ordinary Fourier series analysis of non-sinusoidal waveform is the method by which the amplitudes and phases of the various frequency components are obtained in this case.

However, if the waveform is non-periodic in nature then the frequency spectrum contains a continuous distribution of all possible frequency components from minus infinity to plus infinity. One method of determining what the frequency spectrum is for this case utilizes the Fourier integral—one form of which is shown in the following equation:

$$F(\omega)=\int_{-\infty}^{\infty} f(t)\,\epsilon^{-j\omega t}dt$$

$$F(\omega)=A(\omega)\,\epsilon^{j\theta(\omega)}$$

$$F(\omega)=\int_{0}^{\infty} f(t)\,\epsilon^{-j\omega t}dt$$

$$F(s)=\int_{0}^{\infty} f(t)\,\epsilon^{-st}dt$$

Where $s=\sigma+j\omega$

In this equation $F(\omega)$ is the desired frequency spectrum of the original function of time, $f(t)$. Since $F(\omega)$ is a complex function of $\omega$, it has both magnitude and phase angle and can be expressed as shown in the second equation. Here $A(\omega)$ gives the relative amplitude of each frequency component in the frequency spectrum and $\theta(\omega)$ gives the initial phase, that is, the phase angle at $t=0$. It is important to remember that these amplitudes are only relative and do not represent any actual amplitude. Since the frequency spectrum is continuous, any finite frequency interval must contain an infinite number of frequency components. The actual amplitude of any one frequency component must therefore be infinitesimal if the summation is to represent a finite energy.

Most functions of time which are physical can be considered to be zero for all negative values of time. For these cases the Fourier integral may be written as in the third equation.

These are many functions of time, however, for which the above integral does not converge. These functions are primarily those having finite or indeterminate values at infinite time (such as the unit step function which will be employed a great deal in the present analysis). For such functions the integration may be carried out more conveniently by means of the Laplace transform as shown in the last equation. In this equation, $s$ is a complex frequency having a real positive damping term of $\sigma$ and an imaginary term $j\omega$. One possible interpretation of the Laplace transform is that $F(s)$ represents a spectrum of exponentially damped sinusoids. To convert this spectrum into one consisting of steady-state sinusoids, it is merely necessary to let the damping coefficient approach zero after the integration has been performed. The resulting $F(\omega)$ can be expressed in terms of its magnitude and phase as before.

Figure 1:
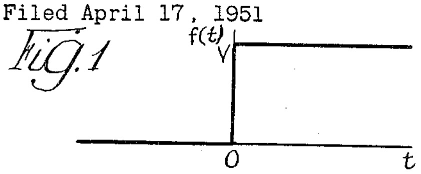
Figures 1 and 2 show the frequency spectrum of a step voltage.
Figure 2:
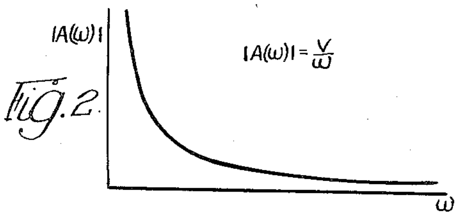

As a preliminary to the analysis, it is instructive to consider the spectra that results from a few simple waveforms. The first example is the step voltage which is shown in Figure 1. The $f(t)$ which is substituted in the Laplace transform for this case is simply a constant, V. The spectrum resulting from this step voltage is shown in Figure 2, and is seen to have an amplitude which is inversely proportional to frequency. A spectrum of this sort would be unsatisfactory for a noise generator because it is not of constant amplitude over any appreciable range of frequencies.

Figure 3:
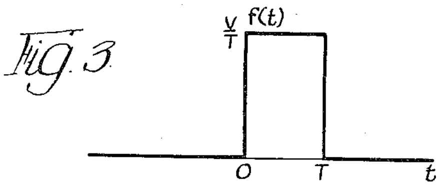
Figures 3 and 4 show the waveform and frequency spectrum of a rectangular pulse.
Figure 4:
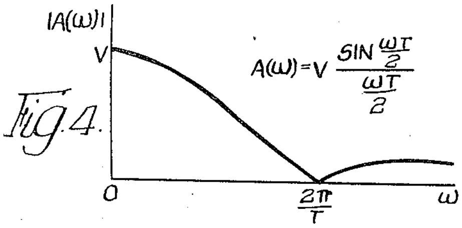

Figure 3 shows the rectangular pulse and Figure 4 shows its corresponding spectrum. This spectrum is reasonably flat at low frequencies, and hence represents an improvement over the step function. The flat portion of the spectrum can be extended up to higher frequencies by making the duration of the pulse less. The limit occurs when the pulse shrinks to zero duration and infinite amplitude, i. e., becomes a unit impulse. The frequency spectrum for this case is merely a constant, that is, it has constant amplitude over an infinite range of frequencies.

This type of spectrum would be the ideal one for a noise generator but unfortunately the unit impulse cannot be produced in a practical circuit. However, the analysis indicates that one of the requirements of the pulse produced by a practical generator is that it be as short as is possible to obtain.

Figure 5:
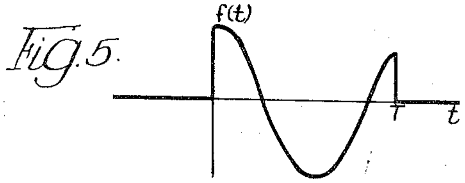
Figures 5 and 6 show the waveform and frequency spectrum of a wave train.
Figure 6:
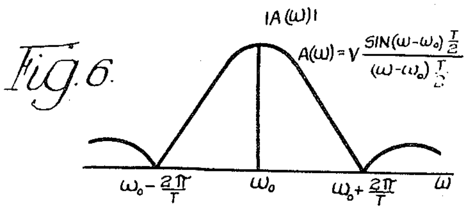

Figure 5 shows a finite wave train and Figure 6 shows its corresponding spectrum. It can be seen that the spectrum for this pulse has the same shape as that of the rectangular pulse but is symmetrical about $\omega_0$ instead of zero frequency. Hence, the maximum amplitudes occur at frequencies near the frequency of the wave train.

Figure 7:
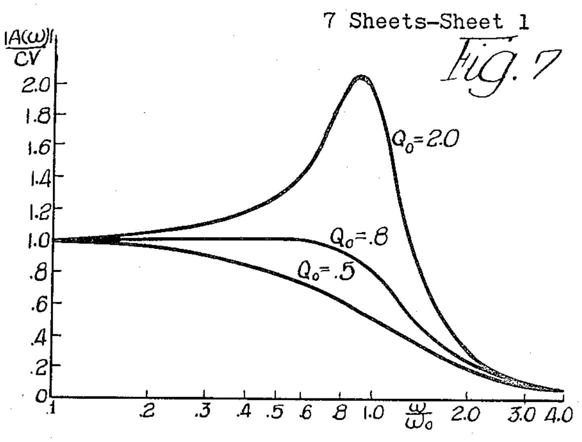
Figure 7 is a graph showing the frequency spectrum resulting from the application of a step voltage to an RLC circuit.

This suggests the possibility of using a pulse which combines the characteristics of both the rectangular pulse and the wave train in such a way that the spectrum of one is large where the spectrum of the other is small, thus producing a spectrum which is flatter than either one alone. There are many ways in which these characteristics might be combined in practical circuits. One possible method is to charge or discharge a condenser through an inductance and a resistance in series. Figure 7 shows the spectrum that results if this is done in circuits having various Q values. It is observed that the flattest spectrum results from a circuit which is slightly under-damped, and will therefore be slightly oscillatory.

The difficulty in using a circuit of this sort is that in order to obtain a flat frequency spectrum up to frequencies in the order of 600 megacycles, extremely small values of inductance and capacitance would be required. These small values are not readily obtainable in lumped constant circuits.

This difficulty naturally leads one to consider the use of distributed constant circuits such as the uniform transmission line. Of the various possible types of transmission lines, the coaxial line is probably the most convenient for this purpose because it is mechanically strong and electrically self-shielding. As used in the noise generator to be described, the coaxial line is charged to a potential of several hundred volts and then discharged into a resistor by means of a mechanically driven contact. In a mathematical sense the closing of the contact can be represented as an application of a step voltage which is equal and opposite to the voltage to which the line is charged, with due regard for the initial conditions of charge. For purposes of analysis, however, it is simpler to assume that the line is initially uncharged. This procedure gives the same frequency spectrum, the same current through the load and the same energy transferred to the load as in the actual conditions.

Figure 8 shows the idealized form of the noise generator and the mathematical expression for the frequency spectrum of the voltage appearing across the resistor $R_s$. This spectrum was obtained by applying the Laplace transform to the differential equations which relate voltage, current, distance and time in the uniform transmission line. In this equation, $\Gamma_s$ is the reflection coefficient at the source end of the line, and $f_0$ is the frequency at which the line is one-quarter of a wavelength long.

If the frequency spectrum is plotted on an arithmetic frequency scale, as shown in Figure 9, it is seen that a reflection coefficient of —.15 gives a reasonably flat spectrum up to about $.8f_0$. This reflection coefficient corresponds to a resistance $R_s$ which is about .74 of the characteristic resistance of the line, and hence the line is slightly under-damped.

Figure 10 shows the same frequency spectrum plotted on a logarithmic scale for a line whose resonant frequency, $f_0$, is 674 megacycles.

Figure 11 shows the output pulse from the noise generator, where T is the time required for the discharge wave to travel from the contacts to the end of the discharge line and return. The so-called peaking frequency or natural period of the discharge line is 1/(2T).

Up to this point the analysis has assumed that the transmission line is lossless and that the charging voltage is a perfect step voltage. A careful analysis of the effects of dissipation indicates that the spectrum amplitude is reduced by less than 0.15 percent at a frequency of $f_0$ if the coaxial line is silver plated. The reduction at lower frequencies is even less.

So far as the charging voltage is concerned, it is a certainty that it is not a perfect step voltage. The exact shape is, of course, not known, but the assumption of an exponential rise in voltage is not unreasonable. If this assumption is made it may be shown that the previous spectrum is multiplied by a factor which is nearly unity at low frequencies and decreases as the frequency goes up. The magnitude of this effect can be illustrated by assuming that the voltage rises to 99 percent of its final value in the time required for the wave to make one round trip on the coaxial line. Figure 12 shows what effect this particular assumption has on the previous spectrum. Measurements on the actual noise generator indicate that the effect is not nearly as serious as is pictured here.

Another item which had to be investigated was the effect of the solid dielectric spacers needed to support the center conductor of the coaxial line. The results indicate that the effect is negligible so long as the computed effective length of the line takes into account the change in dielectric constant in these regions.

The effect of the output cable has also been investigated. It can be shown that if the output cable is long enough so that the pulse can be entirely contained within the cable, then reflections from the far end of the cable can have no effect on the shape of the pulse entering. However, the shape of the pulse appearing at the far end of the output cable depends upon the length of cable, the loss in the cable and the termination of the cable. If the output cable is terminated in its characteristic impedance and is not more than three feet long it may be shown that the spectrum is not changed in relative amplitude by more than 2 percent at any frequency less than 700 megacycles.

One final problem that remains to be discussed is how to determine if the actual frequency spectrum produced by the noise generator is of the same amplitude and shape as that computed theoretically. The general method of measuring the frequency spectrum is to make a point by point measurement with a measuring device having a very narrow pass band so that the amplitude of spectrum is essentially constant over that pass band. The signal that is passed by such a selective circuit can then be investigated by either of two methods.

The first method is to determine the energy passed by the selective circuit. This energy can then be related to the amplitude of the spectrum at the center frequency of the pass band. By repeating the measurement at other center frequencies, the shape of the frequency spectrum may be determined. This method has the advantage that only the amplitude characteristic of the selective circuit needs to be known; the phase characteristic is not needed to determine the energy passed. The disadvantage of this method is the difficulty of obtaining a suitable R. M. S. measuring device which will operate over the entire range of frequencies.

The second method is to measure the peak amplitude of the signal passed by the selective circuit. In order to relate this peak amplitude to the amplitude of the spectrum at the center frequency of the pass band, it is necessary to know both the amplitude and phase characteristic of the selective circuit. If the amplifiers associated with the measuring device have several tuned stages it may be difficult to determine the phase characteristic; and even if it is determined, the integration needed to calculate the peak signal may be difficult and tedious. However, the problem can be simplified considerably by employing several broadly tuned stages in the amplifier and one sharply tuned stage so that the over-all selectivity characteristic is essentially that of a single resonant circuit.

If the amplitude of the spectrum to be measured is assumed to be constant over the pass band of the measuring circuit, then the usual methods of the Laplace transform can be used to determine the peak amplitude of the resulting output. This can in turn be related to the gain and bandwidth of the amplifier. The result of this analysis, as shown in the following equation, is that the amplitude of the spectrum is equal to the peak output divided by 4 times the gain-bandwidth product of the amplifiers:

$$A(\omega_1)=\frac{d_m}{4GB_n}$$

where:

$d_m$=Peak output.
$G$=Gain of amplifier at $\omega_1$.
$B_n$=Equivalent noise bandwidth in cycles per second.
$A(\omega_1)$=Amplitude of spectrum at $\omega_1$ in volts per cycle.

In this expression, the gain is the mid-band gain of the amplifier at a frequency of $f_1$, and the bandwidth is taken to be the equivalent noise bandwidth. The equivalent noise bandwidth is the area under the squared selectivity curve divided by the square of the maximum height of the selectivity curve. This bandwidth is used in preference to the half-power bandwidth because it is less influenced by minor variations from the assumed selectivity characteristic.

Referring now to one coaxial cable type of our invention, and referring first to Figure 13, the apparatus is preferably enclosed in a suitable housing or cabinet having a front instrument panel divided into left and right hand sections 26a and 26b. The power supply apparatus and all of the electrical apparatus having to do with supplying the charging potential to the coaxial line impulse generator, and supplying the driving current which drives the contact mechanism, is enclosed behind the left hand panel section 26a. The 115 volt, 60 cycle supply enters this panel section 26a through an input cable 27 and plug 27a which plugs into a jack in said panel section. The signal impulses transmitted outwardly from the signal generator are transmitted through an output line indicated generally at 28, comprising, for example, a coupling adapter 28a screwing over the threaded outer end of the coaxial impulse generator, as will be later described. Included in this output line 28 may be a suitable attenuator **28*b*, if desired, and another coupling adapter 28*c* connecting with a flexible coaxial cable leading to the instrument to be tested, or to any other point of use of the generated signal impulses. The coaxial impulse generator is indicated in its entirety at 29, and is mounted behind and carried by the right hand panel section 26*b*, being removable therewith in its entirety for quick and easy access to the impulse generator. The charging potential connection and the driving pulse connection are established with the impulse generator 29 through readily disconnectible couplings 101 and 102** directly accessible at the front of the instrument panel.

Referring now to the details of the coaxial cable generator 29, as illustrated in Figures 14, 15, 16, etc., this device comprises a central electrode 30 preferably in the form of a silver plated brass rod surrounded by a coaxial outer electrode 31, preferably made up of an outer silver plated brass sleeve **31*a* and an inner silver plated brass liner sleeve 31*b*. The inner and outer electrodes 30 and 31 are spaced by insulating washers 32, such as polystyrene. The inner ends of these two electrodes are connected by a circular resistance element 33**, which we shall later describe.

Surrounding this inner end of the outer sleeve **31*a* and fixedly secured thereto is an annular metallic body member or ring 34 in which is formed an annular cavity 35. Extending into said cavity 35 is a metallic conducting ring 36 which functions as an electrode member for receiving the charge from the charging source, and which also divides the cavity 35 into a U-shaped or folded-back annular chamber. By virtue of this construction, the discharge line is folded back upon itself to provide complete shielding against undesired radiation, while at the same time maintaining constant impedance. A threaded inner end of the electrode member 36 screws into a diaphragm mounting ring 37 which clamps the outer peripheral edge of a transverse diaphragm 38. The mounting ring 37 is also mounted in an insulating bushing 39 composed, for example, of polystyrene. A polystyrene washer 39′ also spaces the inner end of the electrode member 36 from the inner end of the electrode sleeve 31*a*. The polystyrene bushing 39 is mounted in a metallic mounting ring 40 which is supported in one of the end plates 41 of the assembly. The other end plate of the assembly consists of the above described panel section 26*b*, and these end members are held in spaced relation by spacing sleeves 43, as we shall later describe. Referring again to the cavity member 34, the outer annular lip 51 of this member is provided with a series of spaced longitudinally extending slits to make this lip resilient for a snug sliding or push fit into the projecting end of the metallic mounting ring 40. Surrounding the cavity member 34 is a metallic outer shell 53 which has an inner end flange 53′ which is spaced slightly from the projecting end of the mounting ring 39**.

It will be seen from the foregoing that the electrode member 36 and the diaphragm 38 carried thereby are electrically insulated from the adjacent elements of the assembly by the polystyrene bushing 39 and washer 39′. An electrical connection is extended to this electrode member 36 and diaphragm 38 by a conductor 55 passing through an insulating bushing 56 mounted radially in the mounting ring 40. The inner end of the conductor 55 has electrical connection through a charging resistor 60 (Fig. 20) with the member 36 and diaphragm 38, and the outer end of the conductor has connection with an inwardly thrusting spring clip 58 which has its outer end connecting with a terminal post 59 having insulated mounting in the rear end plate 41. A by-pass condenser may be provided where terminal 59 passes through plate 41, represented by the large metal disks 57 on each side of plate 41, and separated therefrom by mica disks so as to form a by-pass condenser, which serves the same purpose as the by-pass condenser 175 to be later described. The charging resistor 60 is preferably disposed in the insulating bushing 56, substantially as hereinafter illustrated and disclosed in connection with Figure 19A, but it might be included at some other point in the charging circuit, if desired. The charging potential stored in the electrode 36 and diaphragm 38 is adapted to be conducted to the inner electrode 30 of the coaxial line generator through pulsing contact mechanism carried by and responsive to the diaphragm 38, as we shall now describe. The outer electrode 31 of the coaxial line generator is grounded through the metallic supporting plates 41 and **26*b***.

Referring now to this pulsing contact mechanism, it comprises a movable contact 61 carried by the diaphragm 38, and a normally stationary contact 61′ carried by the central electrode 30 of the coaxial line generator, the movable contact 61 being biased to engage the stationary contact 61′ and being separated therefrom by the action of the speaker drive unit to be later described. In the operation of the impulse generator, when the contacts 61, 61′ are separated, the electrode 36 and diaphragm 38 are charged to the full charging potential and act as a capacitor to store energy in the capacitance of the discharge line. The charging resistor 60 (Fig. 20) merely serves to decouple the discharge line and to limit the D. C. current from the charging source to an insignificant value which can be broken without arcing when the contacts separate. It is the high discharge current that produces the noise transient. This current may reach values of approximately 15 amperes as compared to 40 microamperes that flows, due, in effect, to connecting the charging potential of approximately 300 volts to ground through an 8 megohm resistance when the contacts close.

The diaphragm 38 and movable contact 61 carried thereby are adapted to be driven by any suitable drive unit indicated in its entirety at 65. We have successfully used a Western Electric magnetic speaker drive unit type 540–AW, but other drive units may be used, such as Western Electric sound powered telephone transmitter units D–173016, D–173127 and D–173464. In order to use these drivers most effectively with the electrical contact control, it is necessary or preferable to rewind their coils with approximately 1500 turns of No. 40 enamel wire. The movable back contact 61 is mounted in an insulating rod 66 (Figure 16), such as methyl methacrylate, which is mounted on a short steel or beryllium copper rod 67 soldered in a hole in the end of armature 68 of the speaker drive unit 65 (Fig. 20). The windings of this drive unit are indicated at 69, Fig. 20, and are energized by a pulsating drive circuit as we shall later describe.

In order to avoid faulty operation of the contacts 61, 61′, due to the formation of spots of a black deposit on the contact surfaces, we have found that the effective contact areas can be kept clean by forming one of them of extremely small size. For example, we preferably make the stationary front contact 61′ of very small diameter, such as in the neighborhood of 0.006 to 0.008 inch in diameter, so that the deposit forms on the sides of the contact where it does no harm. This small contact is preferably made of approximately 70% platinum and 30% iridium, and stands up very well in service. The cooperating back contact 61 can be made of larger diameter. The contacts are interchangeable so that either the small or large contact may be the movable one. However, since the parts 30 and **31*b* are readily removable from the front of the assembly, it is preferable to have the small contact the stationary contact 61′** for ready removal.

Adjustment of the contacts 61, 61′ is frequently very desirable or important at the different pulsating frequencies transmitted through the pulsating drive circuit to the magnetic speaker drive unit 65. One such adjustment is effected mechanically by shifting the normally stationary contact 61′ axially toward and away from the diaphragm mounted contact 61, by an adjusting arrangement which we shall now describe. The outer end of the outer sleeve 31*a* is formed with a relatively long external thread 71 which screws through a similar thread 72 within the hub 73 of a contact adjusting ring or knob 74. Formed on the outer side of the hub 73 is a thread 75 which screws through a similar thread 76 within a collar 77. The tube **31*a* is fixedly held against rotation and the collar 77 is normally held against rotation with the result that when the adjusting knob 74 is rotated the rotating thread 72 must screw along the coacting stationary thread 71, and the rotating thread 75 must screw along the coacting stationary thread 76. These two sets of threads are made to act differentially by making them of slightly different pitch. For example, the two threads 71—72 are preferably 24 threads to the inch, whereas the two threads 75—76 are 22 threads to the inch. Because of this differential action, a substantial degree of turning movement of this knob 74 will only result in a relatively small inward or outward shifting of the coaxial elements 30—31 for effecting an extremely fine or microscopic axial adjustment of the normally stationary contact 61′ relatively to the diaphragm supported contact 61. For example, in one embodiment of our invention the advance of the contact 61′ per revolution of the knob 74 is 0.0038 inch. The tube 31*a* is held against rotation by a cross bar 91** mounted thereon, as will be later described.

As shown in Fig. 13, the adjusting knob 74 carries a pointer 78 which coacts with dial markings 79 on a stationary circular dial ring 81 in back of the knob 74. Rotation of the knob in one direction from a zero position tends to effect relative movement between the contacts 61, 61′ in a closing direction, whereas rotation in the other direction from this zero position tends to effect relative movement between the contacts in an opening direction, as indicated by the legends on the dial ring 81. The stationary threaded collar 77 is fixedly secured by screws to the dial ring 81, and such dial ring is in turn fixedly mounted in a flanged or recessed opening 82 in the front mounting plate 42 by screws 83. The pointer 78 is carried by a ring 87 which is adjustably clamped between the back of the knob 74 and a clamping disk 88 which is held to the back of the knob by screws 89. Loosening of these screws enables the position of the pointer to be adjusted relatively to the knob for the purpose of adjusting the zero setting of the device.

A constant spring pressure is continuously maintained in an axial direction on the axially adjustable coaxial assembly 30—31, so that no backlash or loose end play can disturb the rather critical setting of the contacts 61, 61′. This spring pressure is transmitted through the aforementioned cross bar 91 which extends diametrically of the tube **31*a* and has a threaded central bore screwing over the thread 71 on the tube. A lock nut 93 also screwing over the thread 71 abuts the back of the transverse bar for locking it to the tube. Two diametrically opposite studs 94 pass through closely fitting guide holes in the ends of the bar 91 and have threaded outer ends 95 screwing into tapped holes in the dial ring 81. The opposite ends of these studs are threaded for receiving adjusting nuts 97 between which and the back of the bar 91 are confined compression springs 98 which maintain a continuous outward pressure through the cross 91 against the coaxial tube 31** for taking up slack or end play in the contact spacing adjustment.

The coupling adapter **28*a* of the output line 28 screws over the external thread 71 on the outer end of the outer coaxial electrode tube 31*a*, and also coacts with the inner coupling element 100** in this tube.

Two of the spacing sleeves 43 which support and maintain the end plates 41 and **26*b* in proper spaced relation are of relatively large size and hollow, one for passing therethrough the charging potential input conductors and the other for passing therethrough the driving pulse input conductors. As shown in Figure 13, detachable cable connectors 101 and 102** establish connection with these conductors at the front of the instrument panel, and by their ready disconnection enable the entire coaxial line impulse generator to be easily removed from the front of the cabinet for inspection, repair, etc.

One preferred embodiment of the discharge resistor 33 is illustrated on an enlarged scale in Figures 15 and 16. This is in the form of a steatite disk 110 having a central bore 111. After the disk has been fired, the areas 112 and 113 are coated with silver by evaporation in vacuum, thereby forming in effect inner and outer ferrules. The coating should be thick enough to be a good conductor and the edges are preferably feathered out by placing a metal washer over areas 114 while the silver is being evaporated on the disk. This intermediate area 114 on the disk between the coated ferrules 112, 113 is sputtered with platinum to form the resistance element. Figure 16 illustrates how the threaded shank of the relatively stationary front contact 61′ passes through the bore 111 of the discharge resistor 33 and screws into a tapped hole in the central electrode 30, thereby connecting the inner ferrule 112 of the resistor to the stationary contact and to the central electrode 30. The outer conducting ferrule 113 of the discharge resistor is clamped in contact with the outer electrode elements **31*a*, 31*b* by a confining ring 100′**.

In Figures 17–19 we have illustrated a modified construction of impulse generator which is quite similar to the embodiment shown in Figure 14, except that it is provided with a different form of mechanical control for effecting adjustment of the contact spacing. This different form of mechanical control is so constructed that it cannot be turned through more than one revolution, and is also capable of being locked in any adjusted position. The purpose of limiting rotation of the contact spacing adjustment to not more than one revolution is to prevent the possibility of damaging the contacts by accidentally rotating the adjustment through an excessive range of movement. In this modified embodiment, the adjustment is made sufficiently coarse, so that one revolution of the adjusting dial will take up the wear for the entire life of one set of contacts. In this modified construction, the adjusting knob 74 is provided on its rear side with a cylindrical hole 121 for receiving the outer end of a pin 122. This pin has a threaded shank 123 which screws into a tapped hole in a motion limiting and clamping disk 124, which is compelled to rotate with the adjusting knob 74 through the connection established by the pin 122. Beyond the threaded portion 123, the pin 122 is provided with a cylindrical extension shank 125 which is arranged to travel in a circular groove 126 formed in the outer face of the stationary front mounting plate 127. To limit the rotative movement of the shank 125 in the groove 126 to not more than one revolution, a stop is provided at one point in the circular groove 126, preferably in the form of a screw 128 which threads into a tapped hole from the rear side of the mounting plate 127 and has its end projecting into the groove 126 in the path of the shank 125. The removal of the screw 128 permits the pin shank 125 to be revolved through a second revolution in the groove 126, if such is necessary in the preliminary adjustment of the device, or after substitution of contacts. However, so long as the stop screw 128 is in place, the adjusting knob 74 cannot be rotated through more than one revolution.

Any adjusted setting given to the adjusting knob 74 can also be locked in place by the rotation of a locking screw 131 that projects forwardly from the lower part of the mounting plate 127. This locking screw or knob 131 has a reduced shank 132 that passes through aligned holes in a clamping segment 133 and in a peripheral confining ring 134. The inner end of the reduced shank 132 is threaded at 135 for screwing into a tapped bore in the mounting plate 127. The confining ring 134 is merely for the purpose of preventing outward displacement of the disk 124, this ring having a confining shoulder 136 which overlies a peripheral shoulder on the disk 124. Screws pass through the confining ring 134 at angularly spaced points and thread into the mounting plate 127 for holding the ring in place. The clamping segment 133 has an outer leg which abuts against the face of the mounting plate 127 at 138, and has an inner leg which abuts against the disk 124 at 139, just inside the confining ring 134. Screwing the locking knob 131 inwardly serves to exert locking pressure on the disk 124 at the point 139 for holding the disk 124 in any adjusted position of the adjusting knob 74.

While contact adjusting rotation is being imparted to the adjusting knob 74, the outer threaded tube 31*a* of the coaxial generator is held against rotation by a transverse cross bar 141 mounted thereon, as best shown in Figure 18. This bar has a threaded central hole 142 screwing over the thread on the sleeve 31*a*, and extending outwardly from this central opening are slots 143. Screws 144 pass through the slotted portions and have their threaded ends screwing into tapped bores 145 in the cross bar, whereby upon the tightening of these screws 144 the two halves of the threaded bore 142 can be firmly clamped against the thread on the sleeve 31*a*. The outer ends of the cross bar 141 are notched out to form guide openings 146 which engage over two of the diametrically opposite spacing posts or sleeves 43 to hold the bar 141 against rotation. Slots 147, 147' extend inwardly of the bar at each corner of each guide notch 146 so as to give lateral resilience to the finger portions 148, 148' defining the sides of each guide notch 146. Screws 149 pass freely through holes in the finger portions 148 and screw into a tapped bore 150 provided in the intermediate tongue portion 151. These screws 149 enable the finger portions 148 to be drawn towards each other so as to obtain a very accurate guiding engagement between the finger portions and spacing posts 43, whereby to eliminate substantially all angular play of the cross bar 141 with respect to the spacing posts 43.

Any end play or slack in the contact spacing adjustment is taken up by compression springs 154 which are mounted on the two spacing sleeves 43 that are embraced by the notched ends of the cross bar 141. The rear ends of these compression springs 154 bear against collars 155 which are adapted to be held in any position lengthwise of the spacing sleeves 43 by a suitable set screw or the like. The front ends of the springs 154 transmit pressure through the washers 157 to the back side of the cross bar 141 for continuously exerting a pressure in a forward direction on the coaxial sleeve 31*a*. As a further precaution to prevent accidental turning of the coaxial sleeve 31*a* and damaging the contacts 61, 61' by the use of excessive force in connecting the output cable, a locking nut 161 is arranged for screwing over the thread 71 of the coaxial sleeve 31*a*, this locking nut being screwed tight up against cross bar 141 after the latter has been set. As shown in Figure 19, this locking nut 161 is formed with a clamping segment 162 which can be forced inwardly against the thread 71 by the action of a screw 163, so as to rigidly hold the nut 161 fast to the coaxial sleeve 31*a*.

In this modified embodiment, access to the discharge line is attained by removing the four screws 166 which hold the back plate 41 in place, whereupon this back plate with its sub-assemblies is removed. This embodiment of impulse generator is usually mounted in a larger front panel which is provided with a round hole just large enough to permit the confining ring 134 to set into the hole, an additional notch being cut in the lower portion of the hole to clear the locking segment 133. Holes provided in such front panel receive front screws 166 for securing the impulse generator to the back side of the front panel. These impulse generators can be assembled with different lengths of discharge line for obtaining different peaking frequencies. The proportions illustrated in Figure 17 typify a relatively short discharge line having a peaking frequency of approximately 1050 mc., with a flat response out to approximately 800 mc. In this illustrated construction the coaxial line elements 30, 31*a* and 31*b* and the spacing sleeves 43 are long enough to accommodate a line peaked in the neighborhood of 700 mc., and can be made longer or can be substituted by longer parts if necessary.

In this modified embodiment, the charging voltage and the driving power for the impulse generator are brought in through plug-in jacks carried by the small insulating panel 171. The balanced armature driver and its dust cover are indicated at 173. One embodiment of charging resistor assembly is illustrated in Figure 19A, and comprises the resistor 60*a* having its inner end electrically connected to member 36 through ring 37. A spring 174 at the inner end of the resistor 60*a* functions both as a compression spring and as an R. F. filter choke. Indicated at 176 is a by-pass condenser, preferably of a standard through-type, the outer case of which is threaded to screw into the bushing 56. It serves both as a by-pass condenser and terminal. A second filter condenser of this type is used to conduct the charging voltage through the back plate 41. This charging resistor assembly of Figure 19A can be used with either of the embodiments illustrated in Figures 14 or 17.

In Figure 19B, the magnetic driver unit has an insulated mounting on an insulating support 178 carried by back plate 41. In this embodiment of Figure 19B the insulator 66 of Figures 16 and 17 has been replaced by a charging resistor 179. In order to minimize any effects of voltages induced in the charging circuit from the driving voltage pulses, a condenser 175 is connected between ground and the terminal to which the charging voltage is applied. A damping resistor 177 of approximately 10,000 ohms resistance is preferably connected across the driver coil to improve its performance. The other parts of this modified embodiment which are similar to parts illustrated and described in the embodiments of Figures 14 and 17 have been identified with the same reference numerals.

We shall refer now to the circuit diagram of Figure 20 for a brief description of the power supply circuit, the driver circuit for driving the speaker unit 65 or 173, and the charging potential control and reversing circuit for reversibly charging the electrodes of the coaxial line generator. It will be understood that this circuit diagram can be used either with the embodiment shown in Figure 14 or with the modified embodiment shown in Figure 17. The power supply, typically represented by the conventional 115 volt 60 cycle line, is indicated at 181 and connects with the primaries of two transformers 182 and 183. The transformer 182 has three secondary windings 184, 185 and 186 which feed plate and filament power to the three twin triode tubes 187, 188 and 189, and also to the two indicator lamps 191 and 192. A rectifier tube 193 is connected between the center-tapped secondary winding 184 and the plate supply network. The twin triode tube 187 and its associated circuits form a multi-vibrator which produces a fixed width pulse and a variable width pulse. This unsymmetrical square wave is fed to the twin cathode follower tube 188. The fixed width pulse, which is used to close the contacts 61, 61' with the same driving force regardless of the number of pulses per second, is determined by the fixed capacitance 195 and the fixed resistance 196. The pulse repetition rate is controlled by the condenser 197 and the variable resistance 198. The resistance 199 is adjusted or proportioned so as to give the best operating point for the grids of the cathode followers. However, it is to be understood that this resistance 199 may be eliminated, and the cathode follower tube 188 may be capacitance coupled to the output of the multi-vibrator tube 187, if resistances 201 and 202 are reduced to 500 ohms each, and blocking condensers of the order of 1 microfarad are inserted between plate 187a and resistor 201, and between plate 187b and resistor 202.

The cathode follower tube 188 provides a better impedance match to the lower impedance now characterizing the energizing coils 69 used with the newer types of magnetic drivers. If the cathode follower tube 188 is direct connected as shown, the pulse repetition rate can be reduced to very low values without affecting the shape of the driving pulse through energizing coil 69. By means of the potentiometer 206, a D. C. component of current can be made to flow in either direction through energizing coil 66 and thus vary the mean position of the armature 68, whereby to electrically adjust the contact spacing at the contacts 61, 61'. This electrical adjustment of the contact spacing, separate from or supplementary to the mechanical adjustment of such contact spacing, is an important feature in operating the noise generator, particularly from a remote position, and for obtaining very fine control of the contact adjustment.

Some trouble has been experienced with the transfer of metal at the contact points 61, 61', this being particularly true in impulse noise generators whose discharge line impedance is approximately 20 ohms or less, and in which the length of the discharge line is such that its natural period is approximately 1000 mc. or less. In order to avoid this difficulty, it is desirable to reverse the polarity of the charging voltage at intervals preferably not exceeding ten minutes and preferably 15 seconds or so. Although there are several ways in which this can be done, one of the most satisfactory methods is to provide an insulated power supply, such as through the second supply transformer 183, and to reverse the connections automatically at uniform intervals of time. This second transformer 183 comprises two secondary windings 209 and 210, the latter being a center-tapped secondary having connection with a rectifier tube 211. The charging voltage received from the transformer 183 is applied to the movable contacts 212, 213 of a reversing switch arrangement. The stationary contacts 214, 214'' and 215, 215' are connected in the charging circuit leading to the impulse generator 29 fragmentarily indicated in section at the right hand end of Figure 20. One set of these stationary contacts has connection through shielded conductor 216 with the charging resistor 60, and the other set of contacts is grounded through resistor 217. The movable contacts or blades 212 or 213 are actuated by a relay 218 comprising an energizing coil 219. The relay is operated by the multi-vibrator 189, which preferably has a time interval in each position of approximately 15 seconds. The relay 218 also operates a switch 221 for selectively controlling the energization of the indicator lamps 191 and 192 for giving a visual indication at the panel to show the polarity of the charging voltage which is then being transmitted to the impulse generator. Where the impulse generator discharge line is very short, such that its natural period is of the order of 30,000 mc., or higher, the metal transfer may be so slight that the charging potential need not be reversed, in which case the charging potential may be taken from the power supplied through the first supply transformer 182.

Referring to the operation of the circuit for the electrical control of the contact spacing, resistors 223 and 224 are of the order of 500 ohms, so as to provide some cathode bias. Resistors 225 and 226 are of the order of 5000 ohms, and are for the purpose of preventing the operator from reducing the cathode resistance of either half of the cathode follower to a value less than about 5000 ohms. The resistance of the potentiometer 206 is of the order of 10,000 ohms. This makes it possible to vary the value of the cathode resistances from 5500 to 15,500 ohms when there is no load on the cathode follower. However, under normal load conditions, the energizing coil 66 of the magnetic driver is connected between the cathodes, and its ohmic resistance may be as low as 100 ohms.

A vacuum tube volt meter 228, or other suitable volt meter, may be connected as shown, and the small D. C. voltage drop across the resistor 217 used to give an approximate indication of the charging current supplied to the impulse generator. This is useful in determining the adjustment of the contacts 61, 61', particularly where the impulse generator is remote from the operator.

In Figures 21, 22 and 23, we have illustrated a modified embodiment of our invention in the form of a microwave impulse generator, provided with a standard coaxial cable coupling. In Figure 24 we have illustrated this same type of microwave impulse generator coupled to a standard wave guide, as will be later described. Referring first to Figures 21–23, the output line comprises the central inner conductor or electrode 230 and the coaxial outer conductor or electrode 231, separated at their inner ends by the insulating sleeve 232. The outer conductor 231 is at ground potential, and the inner conductor 230 carries at its inner end the relatively stationary contact 261' (Figure 23). Coacting with this stationary contact 261' is a movable center contact 261 carried at the adjacent end of conductor 260 which is supported on the charging resistor 234. This charging resistor 234 is cemented to the diaphragm 238 of a suitable magnetic driver unit, such as an RCA sound powered telephone transmitter. The charging potential is connected to the diaphragm 238 by a suitable spring connection or the like extending from the BNC cable connector 235. The movable conductor 260 is charged during the time the contacts 261, 261' are separated, and is then discharged into the output line 230 when the contacts close. It is the discharge of the energy stored in the capacitance of the line elements 231 and 260 which generates the noise impulse. Assuming ideal conditions with a uniformly distributed D. C. charge on movable conductor 260 at the time of contact, thereupon the current flowing into the central element 230 will have a wave form substantially as shown in Figure 11. This wave is indicated as a voltage wave, or as the voltage drop across the effective discharge resistance caused by the discharge current.

Inasmuch as the output coaxial line comprising the inner and outer conductors 230 and 231 and the intervening insulation 232 is long compared to the length of the movable conductor 260, it can contain the entire noise transient, so that it appears as a pure resistance equal in ohms to its characteristic impedance. In order to obtain the desired reflections on output line 230, 231 to produce the slightly oscillatory wave illustrated in Figure 11, the impedance of the output line 230, 231 is made less than the impedance of charge line 260, 231. For microwave impulse generators where the losses would be higher at the upper end of the frequency spectrum, it is convenient to make the impedance of the output line $$\frac{1}{\sqrt{2}} \times \text{impedance of the discharge line}$$

that is $$\frac{R}{Z} = .707$$

instead of .74, as given for the original impulse generator. A convenient way of doing this is to make the conductor diameters the same for both the discharge line and the output line, but to insulate the output line 230, 231 with "teflon" (tetrafluoroethylene) which has a dielectric constant of 2.0, such being the composition of the insulating sleeve 232, while using air insulation for the discharge line. For example, if the impedance of the discharge line is 20 ohms, then the impedance of the output line would be 14.14 ohms.

The type N connector designated 241 is intended as being representative of a suitable connector for the present microwave impulse generator, and has a nominal impedance of 50 ohms. In order to obtain a smooth transition from the 14.1 ohm output line of the impulse generator to the type N connector 241, the line is preferably tapered. Mounted within the outer conductor 231 is a liner part 242 which is tapered to produce a transition from 14.1 ohms to 50 ohms. Continuing from the liner 242 is a further liner extension 243 which is also tapered, and disposed centrally thereof is a tapered conductor extension 244 extending from the axial conductor 230. The respective tapers of the two extension members 243 and 244 are such as to maintain 50 ohms impedance while increasing the diameter to that of the type N connector 241. It will be understood that output lines of other impedances could be matched to the standard coupling in a similar manner. Mounted between the axial conductor 230 and the liner members 242 and 243 is a spacing ring or guide 245 which serves as a guide for the end of the axial conductor 230 and its tapered extension 244, and which also serves as a stop to prevent the tapered extension 244 from being pushed in by an improperly made coupling. The hole in the end of this conductor extension 244 is made sufficiently deep to permit a slight movement of extension 244 without setting up an end thrust on axial conductor 230 that could disturb the contact spacing.

In order to hold the axial conductor 230 and the insulating sleeve 232 rigidly in position, once they are adjusted, slits are sawed in opposite sides of the threaded inner portion of outer conductor 231, and these two sides are then pressed together tightly on the insulating sleeve 232 and axial conductor 230 by means of a set screw 247 mounted in a nut 248 screwing over the split threaded end of the outer conductor 231. To prevent the set screw from damaging the threads on the conductor 231, we place an aluminum plug 249 under the end of the set screw. The axial conductor 230 is clamped in place with its contact 261′ at a distance from the end of outer conductor 231 equal to the length of movable conductor 261.

Different forms of magnetic drivers may be employed, but in this embodiment we have illustrated a transmitter unit from a sound powered telephone manufactured by RCA for the Armed Forces. This unit has a Bakelite frame which makes it easy to insulate the armature and diaphragm from the grounded housing 251 and end cap 252. The armature of such unit is unbalanced and flexible, and hence a stiff diaphragm is desirable to hold the armature in place between the magnet poles. The diaphragm is made of anodized aluminum alloy, and the diaphragm and armature are light enough so that impulse generators can be driven by it at repetition rates in excess of 6000 pulses per second. The charging resistor 234 (Figure 23) is cemented to the diaphragm by means of a suitable cement, such as Glyptal No. 1286. The anodized surface, which is an insulating medium, is removed at the area where the resistor is to be mounted, and electrical contact made between the resistor and the diaphragm by an air drying silver paint.

This embodiment of impulse generator affords two mechanical adjustments of the contact spacing, in addition to the electrical adjustment afforded by the potentiometer 206. One of these mechanical adjustments is a coarse adjustment and the other a fine adjustment. The mechanism for effecting the coarse adjustment comprises a cross bar 141′ which is substantially the same as the cross bar 141 of Figures 17 and 18. The center screws 144′ serve to clamp the split central portion of the cross bar over the threaded portion of the outer conductor 231. The notched outer ends 146′ have a sliding guided engagement over guide pins 255 which are mounted in the housing 251. Compression springs 256 on these guide pins exert an outward thrust through washers 257 against the notched ends of the cross bar. The outer screws 149′ enable the notches 146′ to be adjusted in width so as to have a very accurate guided engagement with the pins 255, with a minimum amount of angular play therebetween.

The fine mechanical adjustment is effected through an adjusting knob 74′ which functions similarly to the adjusting knob 74 of Figure 14. This adjusting knob or disk has a hub 73′ provided with an internal thread 72′ which screws over the long external thread 71′ on the outer conductor 231. Formed on the outer side of the hub 73′ is a thread 75′ which screws through a similar thread within the housing 251. A stop pin or screw 262 projects radially from one point of the adjusting knob 74′, and is adapted to strike a removable stop pin 263 projecting laterally from the end wall of the housing 251. The provision of the coacting stop members 262 and 263 prevents the possibility of the adjusting knob 74′ being rotated through more than one revolution, which might cause damage to the contacts. The coarse adjustment is made by releasing the center screws 144′ in the bar 141′, and then turning outer conductor 231 in both the cross bar 141′ and in the adjusting knob 74′ until the contacts close, such being done with the adjusting knob in such position that its stop pin 262 is about diametrically opposite the stop pin 263, i. e. about midway between end stop limits. When this coarse adjustment has been effected, the center screws 144′ are tightened to rigidly clamp the cross bar 141′ to the threaded portion of the outer conductor 231. Any subsequent fine adjustments can then be effected through the rotation of the adjusting knob 74′. The springs 256 take up any slack in the threads 72′ and 75′, and provide enough tension to prevent the adjusting knob from rotating due to normal vibration. The thread 72′ is a 24 pitch right hand thread, and the thread 75′ is a 20 pitch right hand thread, these proportions being merely given for illustrative purposes. Turning the adjusting knob 74′ produces axial motion of the axial conductor 230 and its contact, without rotation. The rotative movement of this knob 74′ is limited to slightly less than one revolution by the stop pins 262 and 263. Using the threads of the exemplary pitch given, the axial movement of the contacts, per revolution of knob 74′, is one-twentieth inch minus one-twenty-fourth inch =.050−.0416=.0083 inch. This has been found to be a convenient range when using the electrical control 206 for very fine adjustment. It will be understood that the rate of advance of the contact with rotation of the knob 74 can be varied over a considerable range by the choice of other thread combinations. In normal operation, the knob 74′ is set so that the contacts just close when operated with the electrical control 206 in the mid position. As the contacts slowly wear away, it may be necessary to readjust the knob 74′ to keep within the operating range of the electrical or contact spacing adjustment. The electrical connection of the other parts of the circuit shown in Figure 20 to the magnetic driver, etc. of Figures 21–23 will be obvious from the preceding description.

In operating this impulse generator it is necessary to provide a path for the charge delivered from movable conductor 261 to stationary conductor 230 to return to ground between impulses. If there is no direct path to ground, as in the case of using the impulse generator to excite a probe antenna in a wave guide, it is desirable that a leakage path be provided. This can be accomplished by means of the resistor 265, shown more particularly in Figure 22. The resistor is slidably mounted in a removable bushing 266, and is urged inwardly by a spring 267, so that the inner end of the resistor bears against the tapered extension conductor 244. The resistor is only about 1⁄16 inch in diameter, and may have a value ranging from 10,000 to 100,000 ohms. The ends of the resistor are coated with silver paint to make good electrical contact between the resistor and the small tungsten spring 267, and between the resistor and the extension conductor 244.

In Figure 24 we have illustrated the above described modified embodiment of impulse generator connected with a standard waveguide coupling, designated 271. In this adaptation of the invention, the axial conductor 230 of Figure 21 has been substituted by a somewhat longer axial conductor 230*a* which extends down through the waveguide and is clamped in place by the small screw 272 in the lower part 273. This avoids the necessity of providing the diametrically opposite slots in the outer conductor and the clamping nut arrangement 247—249 of Figure 21. The outer conductor 231 of Figure 21 is also substituted by an outer conductor 231$a$ formed substantially as shown. Inasmuch as the axial conductor 230$a$ is grounded to the waveguide coupling 271, there is no need for the leak resistance assembly 265—267. The cup-shaped lower member 273 protects the lower end of the axial conductor 230$a$ from being struck accidentally and thereby changing the contact spacing, while at the same time this cup-shaped member enables the lower end of the axial conductor 230$a$ to be grasped with a tool when it is desired to remove it in case the small contact becomes damaged or worn.

In order to get efficient coupling from the coaxial line into the waveguide, the height of the waveguide at the junction is reduced to match the impedance of the coaxial line. The height of the waveguide can be calculated by means of the following equation for impedance of a waveguide. The impedance $$Z=\frac{\pi^2 b Z_h}{8a}$$

where $a$ is the width of the waveguide and $b$ is its height.

$$Z_h=\sqrt{\frac{\mu_0}{\epsilon_0}}\frac{1}{\sqrt{1-(\lambda_0/2a)}}$$

and $\lambda_0$ is the wavelength in free space. To get efficient coupling from the low impedance waveguide to the normal impedance waveguide, a tapered section 275 is used, substantially as shown in Figure 24. If the maximum output from the impulse generator is desired at a particular frequency, a short circuiting plunger 276 may be adjusted for maximum output. If a broadband of noise is desired, then plunger 276 may be set for the best output at midband.

For applications where it is not necessary to calculate the output of the impulse generator, the center conductor of the discharge line has been made in the form of a small metal cylinder 261$a$ which is pressed into resistor 234, as shown fragmentarily in Figure 24. This arrangement permits the use of smaller diameter discharge lines, which reduces the length of radial path of the discharge, and thus permits a longer discharge line for a given peaking frequency. This makes it possible to use higher peaking frequencies with coaxial line impulse generators. For example, peaking frequencies as high as 50,000 megacycles have been used with this type of construction. This construction also makes it possible to change the effective length of the discharge line by setting the position of axial conductor 230$a$ to permit movable conductor 261$a$ to extend into outer conductor 231$a$ the proper distance.

In Figures 25 and 26 we have illustrated another embodiment of our invention in the form of a flat disk or radial line type of pulse noise generator. This embodiment is especially well adapted to the generation of continuous spectrum signals at millimeter wave lengths. The signals are strong enough for video detection from the cut-off frequency of the waveguide to 100 kmc. The generator makes a very convenient signal source, particularly if used with an appropriate filter-wavemeter and crystal detector. In many respects, this modified construction is similar to that illustrated in Figures 21 to 24 inclusive. Clamped in the cylindrical housing 281 by the clamping ring 282 is the magnetic driver unit, such as modified RCA sound powered telephone transmitter, or any of the other magnetic driver units previously described. Mounted on the outer portion of the housing ring 281 is a mounting ring 283, and beyond this mounting ring is disposed a mounting plate 284. Disposed between the ring 283 and plate 284 are two spacing half-plates which have channels formed in their opposed faces, and in which channels is mounted a rectangular waveguide 287. Cemented to the diaphragm of the driver unit is a charging resistor 288 on the end of which is cemented a platinum iridium disk 294 with the small contact 61 at its center, as shown in enlarged section in Fig. 26. The grounded disk electrode 295 is mounted in the end of the screw 289. These two contacts pass through aligned openings in the top and bottom walls of the waveguide 287, with the point of engagement between the contacts occurring substantially in the center of the waveguide. The electrode 294 is preferably composed of 70% platinum and 30% iridium, and is cemented to the charging resistor 288; and the electrode 295 is preferably a platinum iridium contact in the end of the grounded electrode 289. However, it will be understood that such compositions and construction are merely illustrative.

This embodiment has substantially the same spring loaded differential screw adjustment previously described in connection with Figures 21 to 24. The contact bearing screw 289 is carried by an adjusting screw 291 which extends out through a clamping type of cross bar 141'', similar to the previously described cross bars 141 and 141'. The notched ends of this cross bar have guided sliding engagement over guide pins 255' which are suitably secured to the outer plate 284. The compression springs 256' normally exert outward pressure on this cross bar. The centrally disposed screws 144'' serve to clamp the split portion of the cross bar into firm engagement with the adjusting screw 291. This adjusting screw threads through the internally threaded bore of the adjusting knob 74'', the boss of which has an external thread 75' which screws into a threaded opening in the outer mounting plate 284. The two threads 72' and 75' have the previously described differential relation by reason of different thread pitch, whereby to obtain the extremely fine mechanical adjustment of the contacts. The stop screw 262 carried by the knob 74'' is adapted to coact with the stop pin 263 for preventing the adjusting knob from being accidentally rotated more than one revolution. The same arrangement of circuit illustrated in Figure 20 is also connected to this flat disk embodiment of impulse generator illustrated in Figures 25 and 26.

The tuning plunger 293 is not provided with the screw adjustment inasmuch as its setting is not critical. Usually the best output is obtained with the plunger set very close to the edge of the disk electrodes. As illustrative of the approximate proportions of one embodiment of this flat disk type of generator, the disk electrodes were made 0.065 inch in diameter and were spaced apart 0.006 when the contacts close. The natural period is calculated to be 78 kmc., but it seems that the disks are so tightly coupled to the waveguide that the resonant peak is almost suppressed.

While we have illustrated and described what we regard to be the preferred embodiments of our invention, nevertheless it will be understood that such are merely exemplary and that numerous modifications and rearrangements may be made therein without departing from the essence of the invention.

We claim:

1. In an electrical impulse generator of the class described for generating electrical impulses having a substantially flat continuous frequency spectrum of the order of at least 500 megacycles or higher, the combination of discharge line means, a charging resistor, a charging circuit connected to supply a charging potential to said discharge line means through said charging resistor, a coaxial output line comprising concentric outer and inner conductors associated with said discharge line means, a discharge resistor connected between said output line conductors, a pair of cooperating contacts operative to connect said discharge line means with said coaxial output line for establishing relatively steep wave fronts or step voltages in said electrical impulse generator, electrically energized means for driving said contacts, and a pulsing circuit transmitting pulses to said electrically energized means for driving said contacts at a pulse repetition rate of several thousand pulses per second.

2. In an electrical impulse generator of the class described for generating electrical impulses having a substantially flat continuous frequency spectrum of the order of at least 500 megacycles or higher, the combination of discharge line means, a charging resistor, a charging circuit for supplying a charging potential to said discharge line means through said charging resistor, a coaxial output line comprising concentric outer and inner conductors associated with said discharge line means, a discharge resistor connected between said output line conductors, a pair of cooperating contacts operative to connect said discharge line means with said coaxial output line for establishing relatively steep wave fronts or step voltages in said electrical impulse generator, electrically energized means for driving said contacts, a pulsing circuit transmitting pulses to said electrically energized means for driving said contacts at a pulse repetition rate of several thousand pulses per second, said coaxial output line preventing or minimizing stray signal leakage from said electrical impulse generator, and a coaxial cable for conducting the generated signal impulses from said coaxial output line to an instrument to be tested or other point of use.

3. In an electrical impulse generator of the class described for generating electrical impulses having a substantially flat continuous frequency spectrum of the order of at least 500 megacycles or higher, the combination of discharge line means, a first resistor, a charging circuit for supplying a charging potential to said discharge line means through said first resistor, a coaxial output line comprising concentric outer and inner conductors associated with said discharge line means, said discharge line means encircling said outer and inner coaxial line conductors to minimize stray signal leakage, a second resistor connected between said output line conductors, a pair of cooperating contacts operative to connect said discharge line means with said coaxial output line for establishing relatively steep wave fronts or step voltages in said electrical impulse generator, electrically energized means for driving said contacts, and a pulsing circuit transmitting pulses to said electrically energized means for driving said contacts at a pulse repetition rate of several thousand pulses per second.

4. In an electrical impulse generator of the class described for generating electrical impulses having a substantially flat continuous frequency spectrum, the combination of a coaxial output line comprising concentric outer and inner conductors, a charging resistor, a charging circuit for supplying a charging potential to said coaxial output line through said charging resistor, a pair of cooperating contacts connected between said charging resistor and said coaxial output line and adapted by their operation to establish relatively steep wave fronts in said impulse generator, a discharge resistor connected between said outer and inner coaxial line conductors, electrically energized means for driving said contacts, and a pulsing circuit transmitting pulses to said electrically energized means.

5. In an electrical impulse generator of the class described for generating electrical impulses having a substantially flat continuous frequency spectrum, the combination of a coaxial line comprising concentric outer and inner conductors, a resistor, a charging circuit for supplying a charging potential over said resistor to one of said coaxial conductors, a pair of cooperating contacts arranged to effect connection of said resistor to the other of said coaxial conductors subsequent to application of a charge to said one conductor, the impedance of the circuit including the charging conductor and said resistor being greater than the impedance of said two conductors to establish relatively steep wave fronts in the output therefor, electrically energized means for driving said contacts, and a pulsing circuit for transmitting operating pulses to said electrically energized means to effect intermittent contact operation thereby.

6. In an electrical impulse generator of the class described for generating electrical impulses having a substantially flat continuous frequency spectrum, the combination of a coaxial line comprising concentric outer and inner conductors, discharge line means, a resistor, a charging circuit for supplying a charging potential over said resistor to at least one of said conductors and said discharge line means, a pair of cooperating contacts connected between said charging circuit and the other of said conductors, electrically responsive means for driving said contacts to intermittently connect said resistor and said discharge line means to said other conductor, and a pulsing circuit for transmitting pulses to said electrically responsive means for actuating said contacts independently of reflected waves on said charging line.

7. In an electrical impulse generator of the class described for generating electrical impulses having a substantially flat continuous frequency spectrum, the combination of a coaxial cable having a first conductor coupled as an element of a discharge line and a second conductor coupled with said first conductor as an output line, a complementary element of the discharge line coupled with said first conductor, a resistor, a charging circuit for supplying a charging potential to said discharge line over said resistor, a pair of cooperating contacts connected between said complementary element and said second conductor, said discharge line on closure of said contacts being terminated in a reflecting manner by said output line, electrically responsive means for driving said contacts, and a pulsing circuit for transmitting pulses to said electrically responsive means to effect intermittent operation of the contact members thereby.

8. In an electrical impulse generator of the class described for generating electrical impulses having a substantially flat continuous frequency spectrum, the combination of a coaxial output line comprising concentric outer and inner conductors, said coaxial output line being terminated at its load end in a reflecting manner, a charging circuit connected to supply a unidirectional charging potential thereto, a pair of cooperating contacts connected between said charging circuit and said coaxial output line, a charging resistor connected with said contacts and charging circuit, electrically responsive means for driving said contacts, and a pulsing circuit transmitting pulses to said electrically responsive means for actuating said contacts independently of reflected waves on said output line.

9. In an electrical impulse generator of the class described for generating electrical impulses having a substantially flat continuous frequency spectrum, the combination of a coaxial output line comprising concentric outer and inner conductors, a charging circuit connected to supply a unidirectional charging potential thereto, a pair of cooperating contacts connected between said charging circuit and said coaxial output line, a charging resistor connected with said contacts and output line, electrically responsive means for driving said contacts, a pulsing circuit transmitting pulses to said electrically responsive means, and means associated with said charging circuit for automatically reversing at periodic intervals the polarity of the unidirectional charging potential supplied over said charging circuit to said contacts and coaxial output line.

10. In an electrical impulse generator of the class described for generating electrical impulses having a substantially flat continuous frequency spectrum, the combination of a coaxial output line comprising concentric outer and inner conductors, said coaxial output line having its load end terminated in a reflecting manner, a charging circuit for supplying a charging potential thereto, a pair of cooperating contacts connected between said charging circuit and said coaxial output line, a charging resistor connected with said contacts and output line, electrically responsive means for driving said contacts, a pulsing circuit transmitting pulses to said electrically responsive means whereby to cause actuation of said contacts independently of the reflected waves on said coaxial output line, and manual adjusting means for mechanically adjusting said contact means comprising two differentially acting screw elements having slightly different pitch for obtaining extremely fine adjustment of said contact means.

11. In an electrical impulse generator of the class described for generating electrical impulses having a substantially flat continuous frequency spectrum, the combination of a coaxial output line comprising concentric outer and inner conductors, a charging circuit for supplying a charging potential thereto, a pair of cooperating contacts connected between said charging circuit and said coaxial output line, a charging resistor connected with said contacts and output line, electrically responsive means for driving said contacts, a pulsing circuit transmitting pulses to said electrically responsive means, and electrical adjusting means operative to electrically adjust the relation of said contacts by varying a bias relation in said electrical driving circuit.

12. In an electrical impulse generator of the class described for generating electrical impulses having a substantially flat continuous frequency spectrum, the combination of a coaxial output line comprising concentric outer and inner conductors, a charging circuit for supplying a charging potential thereto, a pair of cooperating contacts connected between said charging circuit and said coaxial output line, a charging resistor connected with said contacts and output line, electrically responsive means for driving said contacts, a pulsing circuit transmitting pulses to said electrically responsive means, manual adjusting means for mechanically adjusting said contact means comprising two differentially acting screw elements having slightly different pitch for obtaining extremely fine adjustment of said contact means, and electrical adjusting means operative to electrically adjust the relation of said contacts by varying a bias relation in said electrical driving circuit.

13. In apparatus of the class described, the combination of a charging circuit for supplying a unidirectional charging potential, discharge line means including contact means adapted to receive unidirectional charging potentials from said circuit, means for pulsing said contact means at relatively high frequencies independently of reflected waves in said apparatus for establishing relatively steep wave fronts having a rise time of $10^{-9}$ second or less, and impulse generator elements containing inductance, capacitance and effective resistance adapted to have said relatively steep wave fronts applied thereto for the generation of substantially continuous frequency spectra.

14. In apparatus of the class described, the combination of a charging circuit for supplying a unidirectional charging potential, discharge line means including contact means adapted to receive unidirectional charging potentials from said circuit, means for pulsing said contact means at relatively high frequencies for establishing relatively steep wave fronts having a rise time of $10^{-9}$ second or less, an impulse generator containing inductance, capacitance and effective resistance adapted to have said relatively steep wave fronts applied thereto, said contact pulsing means operating independently of reflected waves in said impulse generator, and high frequency cable or wave guide means for conducting the signal impulses from said impulse generator to a point of use.

15. In apparatus of the class described, the combination of a charging circuit for supplying a unidirectional charging potential, discharge line means including contact means adapted to receive unidirectional charging potentials from said circuit, means for pulsing said contact means at relatively high frequencies independently of reflected waves in said apparatus for establishing relatively steep wave fronts having a rise time of $10^{-9}$ second or less, impulse generator elements containing inductance, capacitance and effective resistance adapted to have said relatively steep wave fronts applied thereto for the generation of substantially continuous frequency spectra, and mechanical adjusting means for said contact means comprising two differentially acting screw elements for obtaining extremely fine adjustments of said contact means.

16. In apparatus of the class described, the combination of a charging circuit for supplying a unidirectional charging potential, discharge line means including contact means adapted to receive unidirectional charging potentials from said circuit, means operating independently of reflected waves in said apparatus for pulsing said contact means at relatively high frequencies for establishing relatively steep wave fronts having a rise time of $10^{-9}$ second or less, impulse generator elements containing inductance, capacitance and effective resistance adapted to have said relatively steep wave fronts applied thereto for the generation of substantially continuous frequency spectra, and electrical adjusting means cooperating with said contact pulsing means for electrically adjusting said contact means.

17. In apparatus of the class described, the combination of a charging circuit for supplying a unidirectional charging potential, discharge line means including contact means adapted to receive unidirectional charging potentials from said circuit, means for pulsing said contact means at relatively high frequencies for establishing relatively steep wave fronts, impulse generator elements containing inductance, capacitance and effective resistance adapted to have said relatively steep wave fronts applied thereto for the generation of substantially continuous frequency spectra, and automatic means for periodically reversing the polarity of said unidirectional charging potential in said charging circuit.

18. In apparatus of the class described, the combination of a charging circuit for supplying a unidirectional charging potential, discharge means including contact means adapted to receive unidirectional charging potentions from said circuit, means for pulsing said contact means at relatively high frequencies independently of reflected waves in said apparatus for establishing relatively steep wave fronts having a rise time of $10^{-9}$ second or less, impulse generator elements containing inductance, capacitance and effective resistance adapted to have said relatively steep wave fronts applied thereto for the generation of substantially continuous frequency spectra, one of the contacts of said contact means having an extremely small contacting area to minimize the formation of black deposit on the contact surfaces.

19. In apparatus of the class described, the combination of a charging circuit for supplying a unidirectional charging potential, discharge line means including contact means adapted to receive unidirectional charging potentials from said circuit, means operating independently of reflected waves in said apparatus for pulsing said contact means at relatively high frequencies for establishing relatively steep wave fronts having a rise time of $10^{-9}$ second or less, impulse generator elements containing inductance, capacitance and effective resistance adapted to have said relatively steep wave fronts applied thereto for the generation of substantially continuous frequency spectra, and a waveguide coupling connected to the discharge end of said impulse generator substantially at right angles thereto.

20. In apparatus of the class described, the combination of a charging circuit for supplying a unidirectional charging potential, discharge line means including contact means adapted to receive unidirectional charging potentials from said circuit, means for pulsing said contact means for establishing relatively steep wave fronts, and an impulse generator of radial line type comprising a pair of outwardly extending disk elements having said contact means disposed therebetween, whereby said relatively steep wave fronts generate substantially continuous frequency spectra in said impulse generator.

References Cited in the file of this patent

UNITED STATES PATENTS 791,856 Apple ---------- June 6, 1905

968,358 Jacobson ---------- Aug 23, 1910

2,462,918 Stiefel ---------- Mar. 1, 1949

2,470,550 Evans ---------- May 17, 1949

2,496,979 Blumlein ---------- Feb. 7, 1950

2,546,952 Spencer ---------- Mar. 27, 1951